(12) United States Patent
Foresti

(10) Patent No.: US 11,780,550 B2
(45) Date of Patent: Oct. 10, 2023

(54) ELECTRIC POWER GENERATOR FOR VESSELS

(71) Applicant: MASE GENERATORS S.P.A., Cesena (IT)

(72) Inventor: Luigi Massimiliano Piero Maria Foresti, Cesena (IT)

(73) Assignee: MASE GENERATORS S.P.A., Cesena (IT)

( * ) Notice: Subject to any disclaimer, the term of this patent is extended or adjusted under 35 U.S.C. 154(b) by 299 days.

(21) Appl. No.: 17/275,788

(22) PCT Filed: Sep. 12, 2019

(86) PCT No.: PCT/IB2019/057704
§ 371 (c)(1),
(2) Date: Mar. 12, 2021

(87) PCT Pub. No.: WO2020/053809
PCT Pub. Date: Mar. 19, 2020

(65) Prior Publication Data
US 2022/0048604 A1 Feb. 17, 2022

(30) Foreign Application Priority Data
Sep. 12, 2018 (IT) .......................... 102018000008550

(51) Int. Cl.
*B63H 21/17* (2006.01)
*H02K 11/30* (2016.01)
(Continued)

(52) U.S. Cl.
CPC ............... *B63H 21/17* (2013.01); *H02K 9/06* (2013.01); *H02K 9/227* (2021.01); *H02K 11/30* (2016.01); *F01P 2050/06* (2013.01)

(58) Field of Classification Search
CPC ........ B63H 21/17; H02K 11/30; H02K 9/227; H02K 9/06; F01P 2050/06
See application file for complete search history.

(56) References Cited

U.S. PATENT DOCUMENTS

| 5,014,660 A | 5/1991 | Westerbeke, Jr. |
| 5,058,660 A | 10/1991 | Hedstrom |
| (Continued) | | |

FOREIGN PATENT DOCUMENTS

| EP | 1426287 A1 | 6/2004 |
| GB | 2551875 A | 1/2018 |

OTHER PUBLICATIONS

International Search Report issued in International Patent Application No. PCT/IB2019057704 dated Oct. 23, 2019.
(Continued)

*Primary Examiner* — Stephen P Avila
(74) *Attorney, Agent, or Firm* — NIXON & VANDERHYE

(57) ABSTRACT

An electric power generator for marine vessels includes a containment enclosure, an internal combustion engine housed in the containment enclosure and including a drive shaft, rotating at a variable rotation speed, an alternator housed in the containment enclosure and configured to receive mechanical power from the internal combustion engine and to convert it into electric power, a second cooling circuit configured to cause sea water to circulate, and an electrical power converter connected to the alternator to receive an input current, having an input frequency, and to convert it into an output current, having an output frequency. The second cooling circuit includes a first heat exchanger configured to allow heat exchange between the sea water and the electrical power converter.

17 Claims, 5 Drawing Sheets

(51) Int. Cl.
    *H02K 9/22*      (2006.01)
    *H02K 9/06*      (2006.01)

(56)             References Cited

U.S. PATENT DOCUMENTS 6,121,749  A  *   9/2000  Wills .................... H02P 1/44
                                                            318/785
     6,150,731  A  *  11/2000  Rinaldi ................. B63J 3/02
                                                            290/1 A
     7,005,756  B2     2/2006  Westerbeke, Jr.
  2001/0027757  A1    10/2001  Katayama

OTHER PUBLICATIONS

Written Opinion issued in International Patent Application No. PCT/IB2019057704 dated Oct. 23, 2019.

* cited by examiner

ELECTRIC POWER GENERATOR FOR VESSELS

TECHNICAL FIELD

This invention relates to an electric power generator for vessels and to a method for generating electric power.

BACKGROUND ART

In the field of electric power generators for vessels, electric power generators are known which include a fuel fed internal combustion engine that converts the chemical energy of the fuel into the mechanical energy of an output shaft. Electric power generators include an alternator that converts the mechanical energy of the output shaft into electrical energy. The alternators used in the prior art include permanent magnet rotors and stator windings. In the field of electric power generators for vessels, the internal combustion engines used are variable speed engines and it is therefore essential to adapt the frequency of the current produced by the alternator to the supply frequency of the on-board user systems.

To adapt the frequency of the current generated to the frequency on which the user systems are configured to work, an electrical power converter must be provided. This power converter receives as input the electric current generated by the alternator and varies its frequency to a predetermined value.

The electric power generator is housed in an enclosure which, besides protecting the components against dirt, reduces the noise generated by the components.

The presence of a soundproof enclosure, however, brings with it the need to provide suitable means for cooling the components inside the enclosure, which, being isolated from cool air flows, are subject to overheating and to the consequent risk of permanent damage.

Prior art solutions are known in which the enclosure is provided with ventilation grilles which contribute to changing and recirculating the air. These solutions, however, are less effective in terms of noise insulation. Other solutions involve the use of a salt water cooling circuit in which salt water is circulated. The cooling circuit comprises a heat exchanger: the internal combustion engine is cooled by the salt water and the engine cooling fluid flowing inside the heat exchanger. Solutions of this kind are described, for example, in document US7005756B2.

These solutions, however, although they are effective in cooling the internal combustion engine, do not solve the problem of overheating of the electrical power converter. These solutions therefore require frequent maintenance to deal with faults caused by overheated electronic components.

DISCLOSURE OF THE INVENTION

The aim of this invention is to provide an electric power generator for vessels to overcome the above mentioned disadvantages of the prior art. This aim is fully achieved by the electric power generator for vessels of this disclosure as characterized in the appended claims.

According to an aspect of it, this disclosure provides an electric power generator for marine vessels. The electric power generator comprises a containment enclosure. The containment enclosure may be connected to the vessel. The containment enclosure allows isolating the components of the electric power generator from dirt and isolating the outside environment from the noise caused by the components of the electric power generator. In a preferred embodiment, the power generator is contained entirely in the containment enclosure. This embodiment allows noise pollution to be considerably reduced and also reduces the risk of infiltrations which could damage some of the components of the power generator.

The electric power generator comprises an internal combustion engine. The internal combustion engine is housed in the containment enclosure. The internal combustion engine comprises a drive shaft. The drive shaft rotates at a speed which is variable (over time). In other cases, the drive shaft rotates at a constant rotation speed.

The internal combustion engine includes a first cooling circuit that contains a cooling fluid. More specifically, the first cooling circuit comprises at least one pipe in which a cooling fluid circulates.

The electric power generator comprises an alternator. The alternator is housed in the containment enclosure. The alternator is configured to receive mechanical power from the internal combustion engine and to convert it into electric power. The alternator includes a stator. The alternator includes a driven shaft, connected to the drive shaft to receive mechanical power. The alternator includes a rotor, keyed to the driven shaft. In an embodiment, the rotor includes permanent magnets.

In an embodiment, the power generator comprises a second cooling circuit. The second cooling circuit is configured to circulate sea water from an inlet section to an outlet section. In an embodiment, the inlet section and the outlet section are formed in the containment enclosure. In an embodiment, the inlet section is formed in the containment enclosure. In an embodiment, the outlet section is formed in an exhaust pipe of the internal combustion engine. The exhaust pipe is in turn connected to an exhaust section, formed in the containment enclosure.

In an embodiment, the second cooling circuit comprises a recirculation pump, configured to cause sea water to circulate in the second cooling circuit. In an embodiment, the power generator comprises an electrical power converter. The electrical power converter is connected to the alternator. The electrical power converter is connected to the alternator to receive an input current having an input frequency. The electrical power converter is connected to the alternator to convert the input current into an output current having an output frequency.

The electrical power converter therefore acts as a frequency variator. This feature is very important for the flexibility of the electric power generator, which is responsible for powering different on-board user systems and not only for marine propulsion, which normally requires a direct current power supply.

In an embodiment, the second cooling circuit comprises a first heat exchanger. The first heat exchanger is configured to allow heat exchange between the sea water and the electrical power converter.

That way, the first heat exchanger, which has sea water flowing through it, allows the electrical power converter to be cooled very efficiently and prevents the possibility of overheating.

In an embodiment the first exchanger includes an exchange element. By exchange element is meant a means, or substance, capable of removing heat from one object and transferring it to another object. Thus, the exchange element preferably has a high thermal conductivity. The exchange element is traversed by an exchange portion of the second cooling circuit. The exchange portion is a portion of pipe of the second cooling circuit in contact with the exchange element. The exchange element is in contact with the electrical power converter to allow it to be cooled. The contact between the exchange element and the electrical power converter must also be understood as an indirect contact, provided always that there is heat exchange, preferably by thermal conduction, between the two components.

In an embodiment, the electrical power converter comprises a plurality of electronic power components. The electronic power component may be, for example, but not necessarily, power switches used to modulate the input power in order to vary its frequency.

In an embodiment, the electrical power converter comprises an electronic card. The electronic card is configured to control the plurality of electronic power components through control signals.

In an embodiment, the electrical power converter comprises a supporting structure. The supporting structure is connected to the containment enclosure to support the electrical power converter.

In an embodiment, the exchange element is in contact with the plurality of electronic power component in order to cool them. This allows selectively cooling those components of the electrical power converter which are subject to the most overheating.

In an embodiment, the supporting structure is an exchange wall. The exchange wall has an inside surface on which the plurality of electronic power components are disposed. The exchange wall has an outside surface that is in contact with the exchange element. In an embodiment, a portion of the exchange wall is constituted by the exchange element. In this case, the exchange wall comprises an opening to accommodate the exchange element.

In an embodiment, the supporting structure includes a first and a second exchange wall. The first and second supporting walls extend upwardly from the exchange wall (preferably perpendicularly to the exchange wall). In an embodiment, the first and second supporting walls are connected to the containment enclosure at respective fastening zones. In an embodiment, the first and second supporting walls are connected to a supporting wall of the vessel at respective fastening zones.

In an embodiment, the supporting structure includes a first cooling opening. In an embodiment, the supporting structure includes a second cooling opening. The first and second cooling openings are aligned along a cooling direction to allow a cooling fluid to come into contact with the electronic card. That way, besides being cooled by the sea water, the electronic card and the electronic power components are cooled by the air flow, thus further reducing the risk of overheating.

In an embodiment, the power generator comprises a fan. The fan is configured to generate a cooling air flow in the cooling direction.

In an embodiment, the second cooling circuit comprises a second heat exchanger. The second heat exchanger is configured to allow heat exchange between the sea water, circulating in the second cooling circuit, and the cooling liquid, circulating in the first cooling circuit.

It should be noted that the embodiment in which the first cooling circuit releases heat to the second cooling circuit through the second heat exchanger is only one of the possible solutions that can be implemented.

More specifically, in an embodiment, the power generator comprises a dedicated radiator. The dedicated radiator is connected to the first cooling circuit to remove from the cooling liquid the heat absorbed from the internal combustion engine. In this embodiment, the air which flows through the radiator removes the heat from the first cooling circuit.

In the same way, in another example embodiment, the power generator might comprise a further dedicated circuit in which sea water circulates and which is distinct and different from the second cooling circuit. The further dedicated circuit extends along the second heat exchanger in which the cooling liquid of the first cooling circuit is flowing. That way, heat exchange occurs between the cooling liquid of the first cooling circuit and "fresh" sea water (meaning by this term, sea water that has not previously been heated in other heat exchangers), thus enhancing heat exchange efficiency.

Moreover, as clarified below, the first cooling circuit and the second cooling circuit are two distinct circuits, each having a respective function in the power generator. This feature allows heat exchange efficiency to reach levels that are difficult to obtain with a single cooling circuit used to cool both the internal combustion engine and the electronic power components.

In an embodiment, the fan is configured to direct a cooling air flow at the alternator and/or the electrical power converter.

In an embodiment, the power generator comprises a third heat exchanger. The third heat exchanger is configured to allow heat exchange between the sea water, circulating in the second cooling circuit, and the cooling air flow generated by the fan. That way, even the air flow that cools the electrical power converter and/or the alternator releases heat to the sea water and reaches the respective components to be cooled with a greater cooling capacity.

In an embodiment, the drive shaft of the internal combustion engine is placed in a horizontal position perpendicular to the weight force. In this configuration of the power generator, the power generator comprises a lubrication pump. The lubrication pump is configured to raise the level of the oil in the internal combustion engine, allowing all the components of the internal combustion engine to be lubricated and/or cooled.

According to an aspect of this description, this disclosure also provides a method for generating electrical power for marine vessels.

The method comprises a step of generating mechanical power by means of an internal combustion engine including a drive shaft which rotates at a variable rotation speed.

The method comprises a first step of cooling the internal combustion engine by means of a first cooling circuit in which a cooling liquid circulates.

The method comprises a step of converting the mechanical power generated by the internal combustion engine into electrical power by means of an alternator.

The method comprises a step of circulating sea water in a second cooling circuit extending from an inlet section to an outlet section. The method comprises a step of adjusting, in an electrical power converter, the frequency of the electric current generated by the alternator.

In an embodiment, the method comprises a first step of cooling, in which the sea water circulating in the second cooling circuit cools the electrical power converter by means of a first heat exchanger.

In an embodiment, the method comprises a second step of exchanging heat between sea water, circulating in the second cooling circuit, and cooling liquid, circulating in the first cooling circuit by means of a second exchanger. In an embodiment, the method comprises a step of ventilating, in which a fan generates an air flow directed towards the electrical power converter to cool it.

In an embodiment, the method comprises a third step of exchanging heat. In the third step of exchanging heat, the air flow passes through a third heat exchanger of the second cooling circuit and cools down by transferring heat to the sea water.

BRIEF DESCRIPTION OF THE DRAWINGS

This and other features of the invention will become more apparent from the following description of a preferred embodiment of it, illustrated by way of non-limiting example in the accompanying drawings, in which.

DETAILED DESCRIPTION OF PREFERRED EMBODIMENTS OF THE INVENTION

Figure 1:
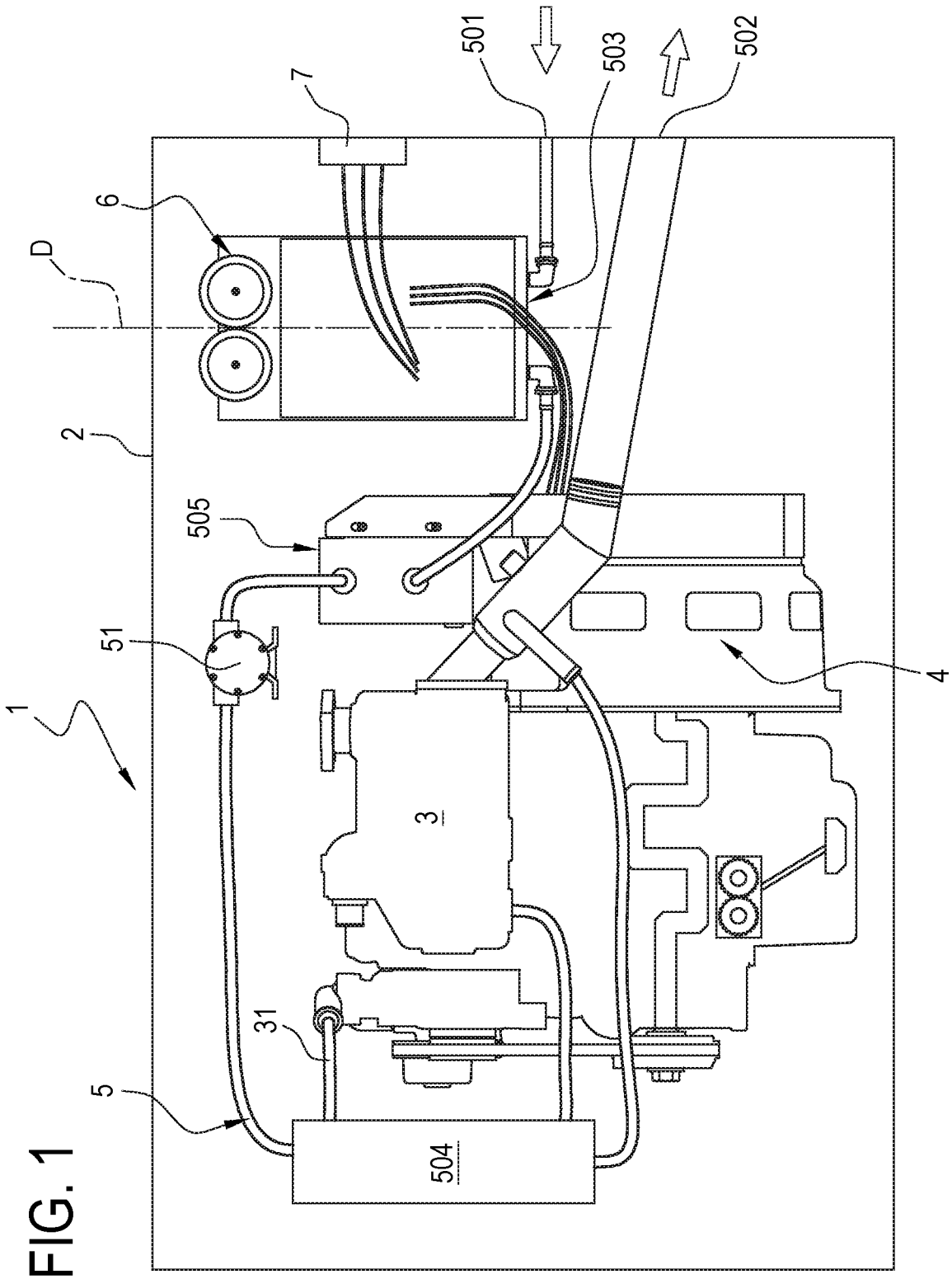
FIG. 1 is a schematic view of an electric power generator for marine vessels.
Figure 2:
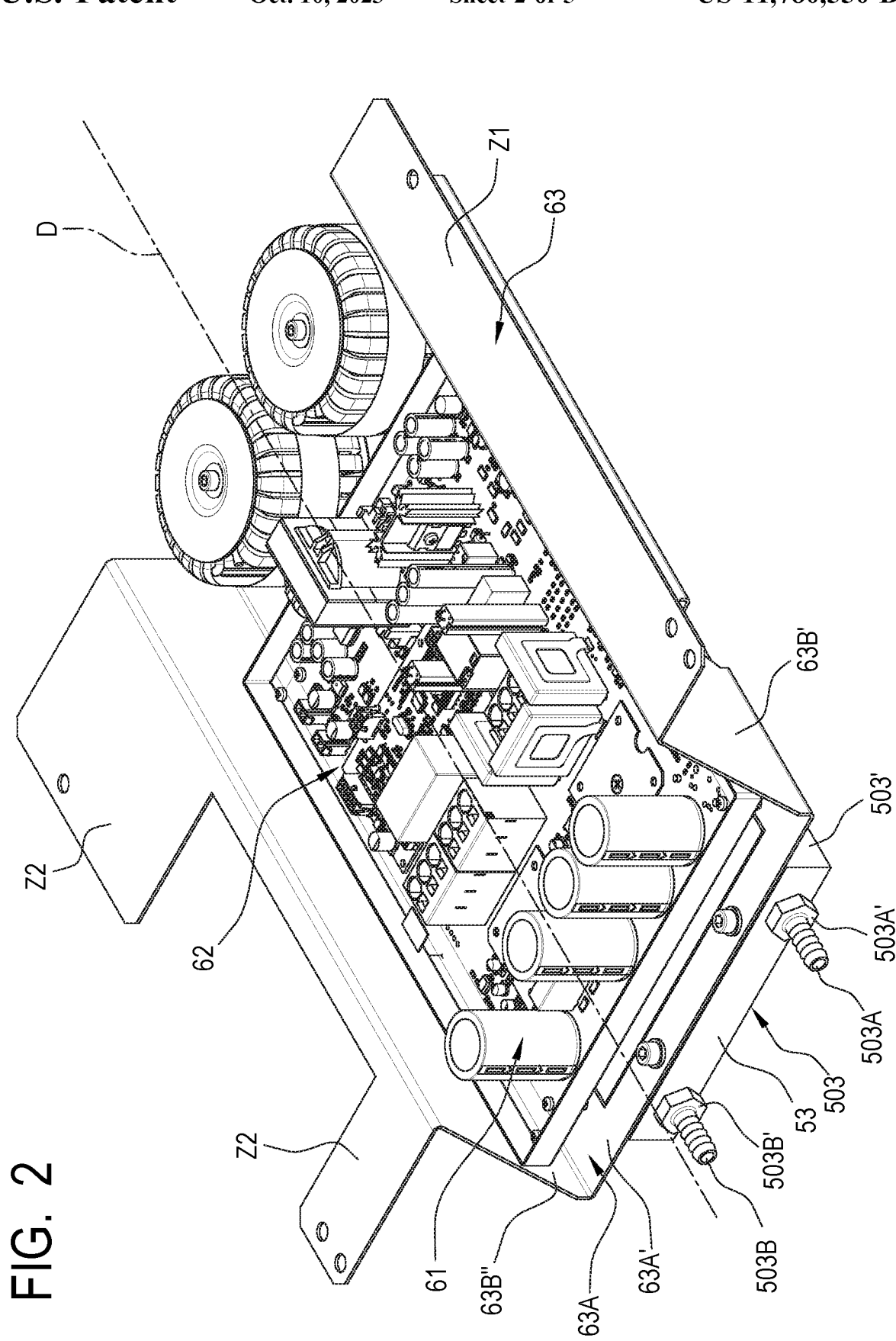
FIG. 2 is a perspective view of an electrical power converter of the power generator of FIG. 1.
Figure 3:
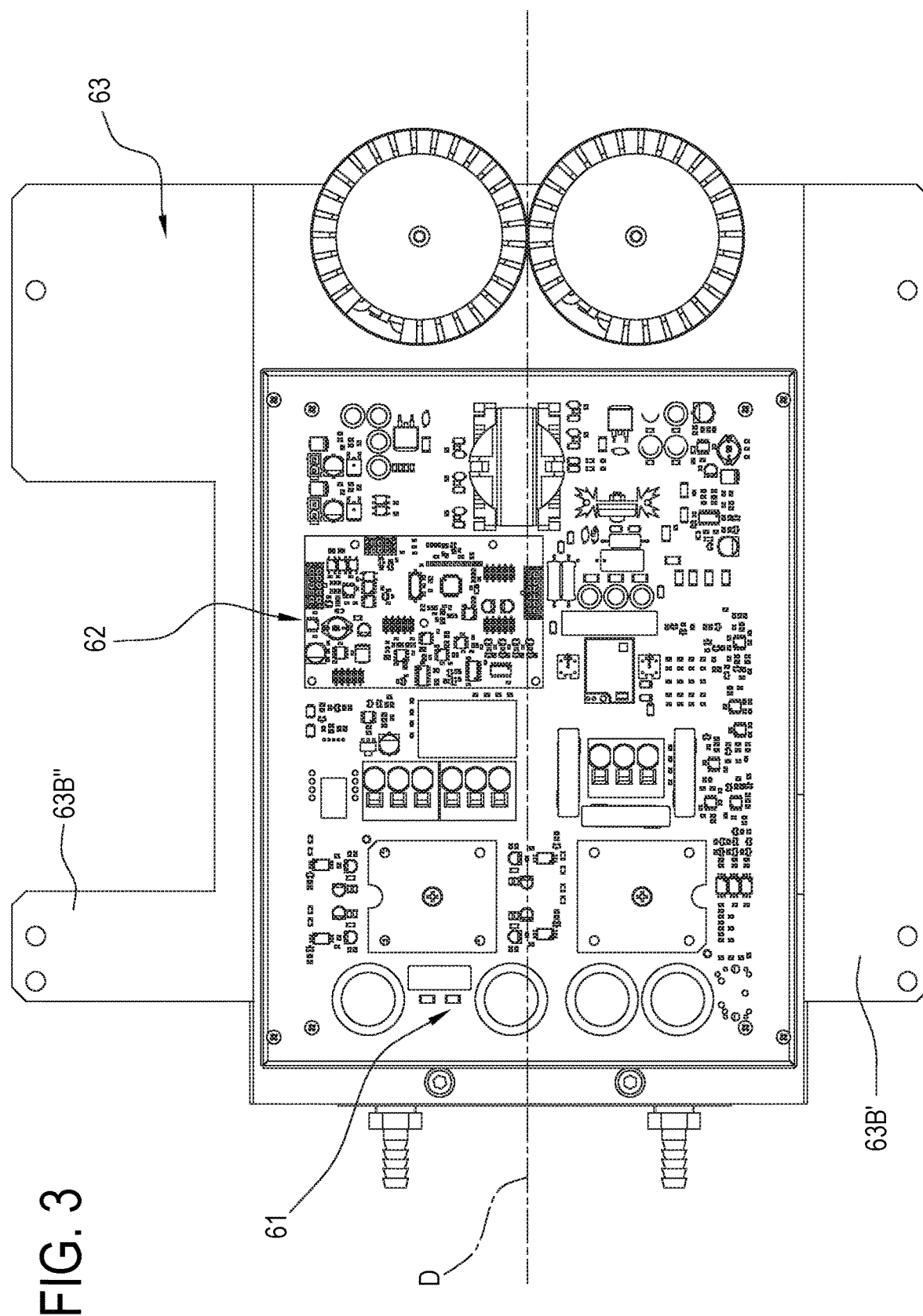
FIG. 3 is a top view of the converter of FIG. 2.
Figure 4A:
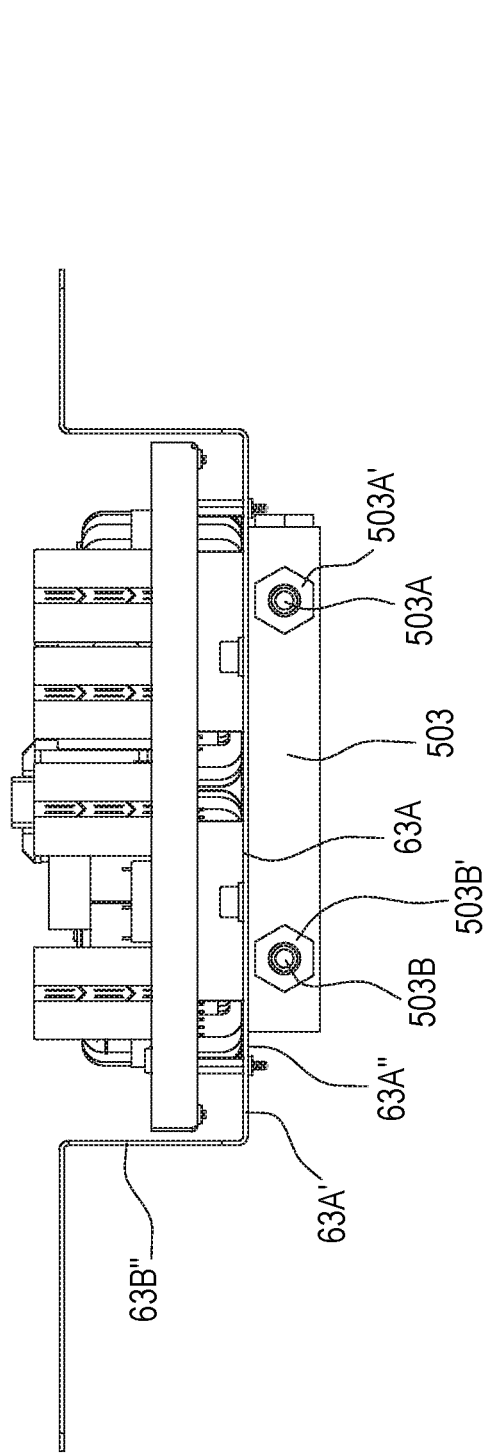
FIGS. 4A and 4B are, respectively, a first side view and a second side view of the converter of FIG. 2.
Figure 4B:
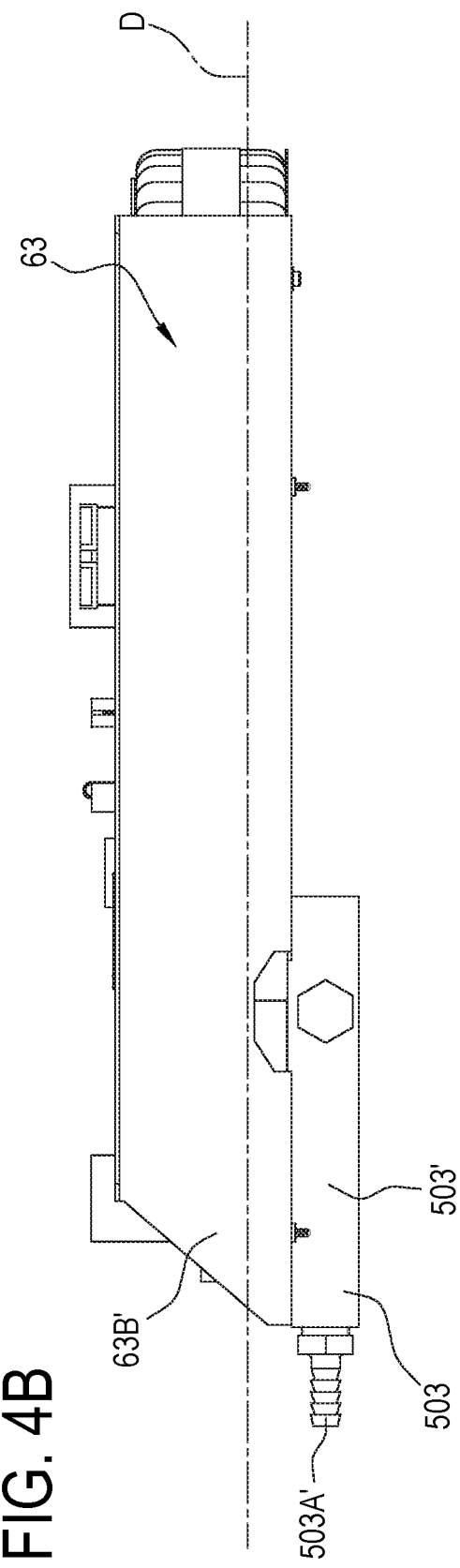
Figure 5:
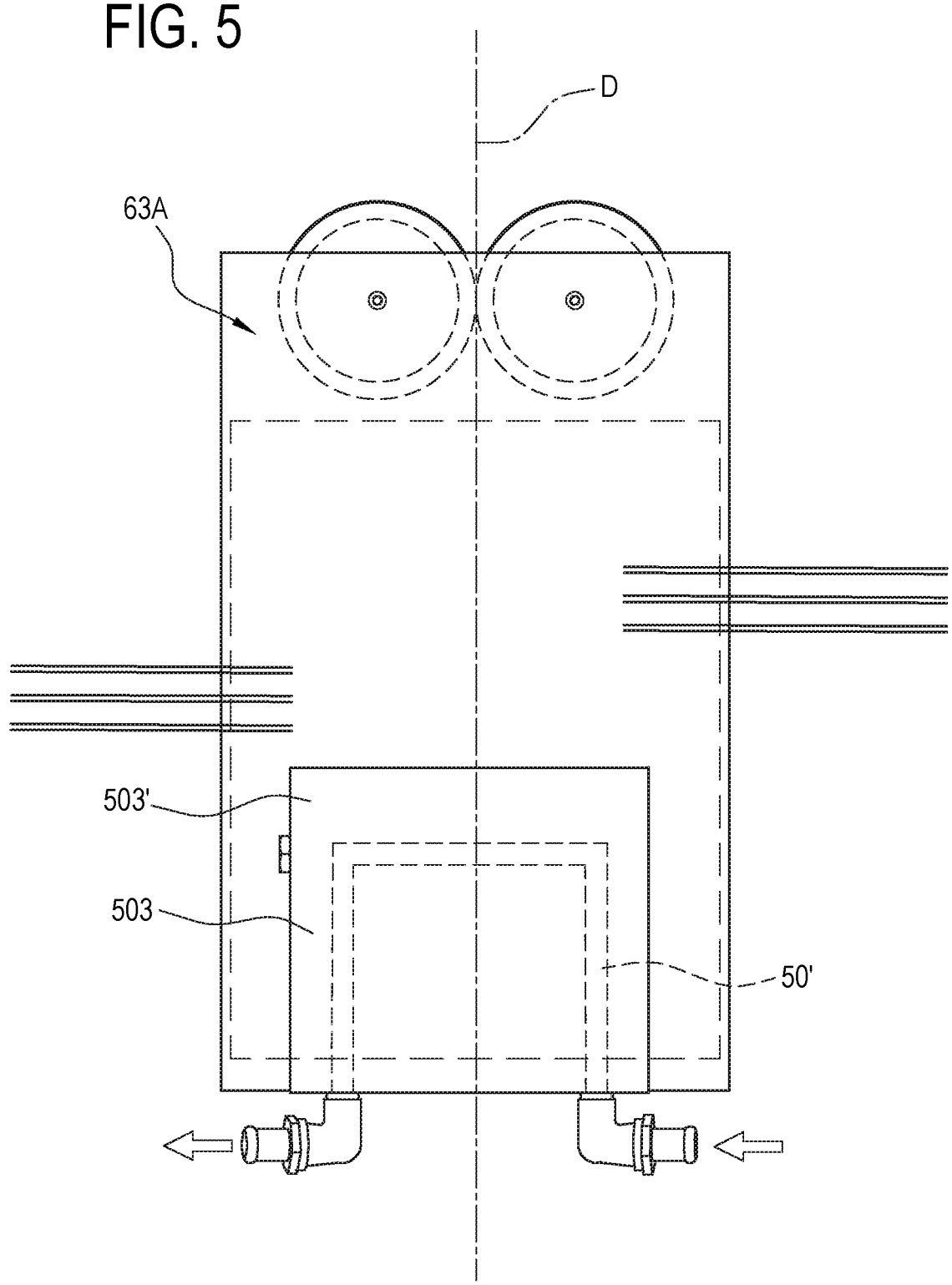
FIG. 5 is a schematic bottom view of the converter of FIG. 2.

With reference to the accompanying drawings, the numeral 1 denotes an electric power generator for marine vessels.

The electric power generator 1 comprises a containment enclosure 2. The containment enclosure 2 may be connected to (or rested on) the frame of the vessel on which the power generator 1 is installed. The containment enclosure 2 is made of sound absorbing material. The containment enclosure 2 is configured to be sealed off from the liquids outside it. In an embodiment, the containment enclosure 2 has a prismatic shape with rounded corners.

The electric power generator 1 comprises an internal combustion engine 3. The internal combustion engine 3 is configured to convert chemical energy by combustion into rotational mechanical energy of a drive shaft. In an embodiment, the drive shaft of the internal combustion engine is parallel to the direction of the weight force. In other embodiments, the drive shaft is perpendicular to the direction of the weight force. In these embodiments, the internal combustion engine comprises a lubrication pump configured to allow recirculating the oil for cooling or lubricating the engine.

The internal combustion engine 3 comprises a first cooling circuit 31. The first cooling circuit is provided with at least one pipe in which a cooling fluid circulates. The cooling liquid may be water, a coolant fluid with specific heat exchange properties, or oil.

In an embodiment, the drive shaft is configured to rotate about an axis of rotation at a speed that is variable over time. In an embodiment, the drive shaft is configured to rotate at a speed that is constant over time.

The internal combustion engine comprises an exhaust pipe 32 configured to convey the combustion exhaust gases to the outside of the containment enclosure 2.

The electric power generator 1 comprises an alternator 4. The alternator 4 comprises a driven shaft. The driven shaft is connected to the drive shaft of the internal combustion engine 3 through a coupling. That way, the motive power of the drive shaft is transmitted to the driven shaft. The alternator 4 comprises a rotor. The rotor is keyed to (rotates as one with) the driven shaft. In an embodiment, the rotor comprises a plurality of permanent magnets. In other embodiments, the rotor comprises a plurality of stator windings energized by an electric current. The alternator 4 comprises a stator. In an embodiment, the stator comprises a plurality of stator windings. When the rotor rotates relative to the stator, it varies the magnetic field flux and generates an induced current on the windings of the stator.

The frequency of the induced current is a function of the rotation speed of the drive shaft. Since the user systems on board are configured to be powered at a predetermined frequency, an electrical power converter is required to adjust the frequency of the induced current generated in the alternator.

The power generator comprises an electrical power converter 6. The electrical power converter 6 is configured to receive an input current (corresponding to the induced current in the stator of the alternator 4) from the alternator 4 and to adjust its frequency to a predetermined value.

The electrical power converter 6 is connected to the alternator through a plurality of electric cables 60. In an embodiment, the alternator is a three-phase alternator. In this embodiment, the plurality of electric cables 60 comprises at least three cables, one for each phase.

In an embodiment, the power generator 1 comprises an electrical connector 7. The electrical connector 7 is disposed on the containment enclosure 2. The electrical connector 7 is configured to be connected to power cables of the on-board user systems.

In an embodiment, the power generator 1 comprises a second cooling circuit 5. The second cooling circuit 5 comprises a plurality of pipes 50 in which a cooling liquid circulates. Preferably, the cooling liquid is sea water. For different requirements, however, another cooling liquid may be used which can in turn be cooled by the sea water at a position outside the containment enclosure 2.

In an embodiment, the second cooling circuit 5 comprises a recirculation pump 51. The recirculation pump is configured to provide a predetermined pressure head on the sea water.

In an embodiment, the second cooling circuit 5 extends from an inlet section 501 to an outlet section 502. In an embodiment, the inlet section 501 is formed in the containment enclosure 2. In an embodiment, the outlet section 502 is formed in the containment enclosure 2.

In an embodiment, the outlet section 502 is formed in the exhaust pipe 32 and leads into the sea by way of the exhaust pipe 32.

In an embodiment, the second cooling circuit 5 comprises a first heat exchanger 503. The first heat exchanger 503 is configured to allow heat exchange between the sea water and the electrical power converter 6. In an embodiment the first exchanger 503 comprises an exchange element 503'. The exchange element 503' is a means having high thermal conductivity, interposed between the sea water and the electrical power converter 6 to allow heat to be conducted between the components.

In an embodiment, the exchange element is a solid base. The solid base may be made of copper or other material having a very high thermal conductivity.

In an embodiment, the base comprises a plurality of channels in which the sea water circulating in the second cooling circuit 5 flows. The plurality of channels defines an exchange portion 50' of the second cooling circuit 5. In other embodiments, the base is hollow and is filled with salt water which is constantly changed to increase heat exchange efficiency.

In an embodiment, the first heat exchanger 503 comprises an inlet port 503A configured to allow the saltwater to flow into the plurality of channels in the base. In an embodiment, the first heat exchanger 503 comprises an outlet port 503B configured to connect the plurality of channels in the base to the ducts 50 of the second cooling circuit 5.

In an embodiment, the inlet port 503A is defined by an inlet connector 503A', having a cylindrical shape and a knurled lateral surface, to allow a hose to be press-fitted onto it.

In an embodiment, the outlet port 503B is defined by an outlet connector 503B', having a cylindrical shape and a knurled lateral surface, to allow a hose to be press-fitted onto it.

In an embodiment, the base 503' comprises a top surface S1, an underside surface S2 and four lateral surfaces S3.

In an embodiment, the top surface S1 is in contact with the electrical power converter 6.

In an embodiment, the inlet port 503A and the outlet port 503B are made on one of the four lateral surface S3.

In an embodiment, the second cooling circuit 5 comprises a second heat exchanger 504. The second heat exchanger 504 is configured to allow heat exchange between the cooling liquid, circulating in the first cooling circuit 31, and the sea water.

The pipes 50 of the second cooling circuit 5 pass through the inside of the second heat exchanger 504. The pipes of the first cooling circuit 31 pass through the inside of the second heat exchanger 504.

In an embodiment, the power generator 1 comprises a fan. The fan is configured to generate a cooling air flow. The cooling air flow is used to cool the alternator 4. The cooling air flow is used to cool the electrical power converter 6. The cooling air flow is used to cool the electrical power converter 6 and the alternator 4.

In an embodiment, the second cooling circuit 5 comprises a third heat exchanger 505. The third heat exchanger 505 is configured to allow heat exchange between the air of the cooling air flow and the sea water in the second cooling circuit 5.

More specifically, in an embodiment, the cooling air flow comes into contact with the third heat exchanger 505. Inside the third heat exchanger 505, the pipes 50 of the second cooling circuit 5 are more closely packed in order to increase the heat exchange surface.

In an embodiment, the third heat exchanger 505 is located at an intermediate position along the direction of the air flow, between the fan and the electrical power converter 6. In an embodiment, the third heat exchanger 505 is located at an intermediate position along the direction of the air flow, between the alternator 4 and the electrical power converter 6. In an embodiment, the third heat exchanger 505 is located at an intermediate position along the direction of the air flow, between the fan and the alternator 4.

In an embodiment, the recirculation pump 51 is disposed along the second cooling circuit 5, at an intermediate position between the second heat exchanger 504 and the third heat exchanger 505.

In an embodiment, the electrical power converter 6 comprises a plurality of electronic power components 61. The electronic power components 61 are configured to vary the frequency of the input current (current induced in the stator) at the converter 6. They are therefore traversed by very high power which causes them to overheat considerably. In an embodiment, the electronic power components 61 are power switches, such as transistors, for example.

In an embodiment, the electrical power converter 6 comprises an electronic card 62. The electronic card is configured to control (drive) the plurality of electronic power components 61. More specifically, in an embodiment, the electronic card is connected to an input of each transistor to send a control signal. Since it sends low-power signals, the electronic card 62 is a component that is less subject to thermal stress.

In an embodiment, the electrical power converter 6 comprises a supporting structure 63. The supporting structure 63 is configured to support the plurality of electronic power components 61 and/or the electronic card 62. The supporting structure 63 is in contact with the exchange element 503' of the first heat exchanger 503.

In an embodiment, the supporting structure 63 comprises an exchange wall 63A. The exchange wall includes an inside surface 63A' on which the plurality of electronic power components 61 and/or the electronic card 62 are mounted (connected). The exchange wall includes an outside surface 63A" that comes into contact with the exchange element 503' of the first heat exchanger 503.

In an embodiment, the supporting structure 63 comprises a first side wall 63B' and a second side wall 63B" which extend upwardly from the exchange wall 63A. Preferably, the first side wall 63B' and the second side wall 63B" are perpendicular to the exchange wall 63A.

The first side wall 63B' and the second side wall 63B" each include a respective fastening zone Z1 and Z2, configured to be connected to the containment enclosure 2 or to a frame of the marine vessel.

In an embodiment, the fastening zones Z1, Z2 of the first and second side walls 63B' and 63B" are bent at an angle to the respective side wall. In an embodiment, the fastening zones Z1, Z2 of the first and second side walls 63B' and 63B" are perpendicular to the respective side wall and parallel to the exchange wall 63A.

In an embodiment, the supporting structure 63 is open to allow cooling air to flow. More specifically, in an embodiment, the supporting structure 63 comprises a first and a second cooling opening aligned along a cooling direction D to allow a cooling fluid to come into contact with the electronic card 62. The first and second cooling openings are preferably defined by the total absence of two opposite side walls of the supporting structure 63. In other embodiments, on the other hand, the first and second cooling openings are defined by slots made in two opposite side walls (if necessary, even the first side wall 63B' and the second side wall 63B").

In an embodiment, the fan is configured to direct the cooling air flow in a direction parallel to the cooling direction D.

The embodiment in which the first cooling circuit 31 releases heat to the second cooling circuit 5 through the second heat exchanger 504 is only one of the possible solutions that can be implemented.

More specifically, in an embodiment, the power generator 1 comprises a dedicated radiator. The dedicated radiator is connected to the first cooling circuit 31 to remove from the cooling liquid the heat absorbed from the internal combustion engine 3. In this embodiment, the air which flows through the radiator removes the heat from the first cooling circuit 31.

In the same way, in another example embodiment, the power generator 1 might comprise a further dedicated circuit in which sea water circulates and which is distinct and different from the second cooling circuit 5. The further dedicated circuit extends along the second heat exchanger 504 in which the cooling liquid of the first cooling circuit 31 is flowing. That way, heat exchange occurs between the cooling liquid of the first cooling circuit 31 and "fresh" sea water (meaning by this term, sea water that has not previously been heated in other heat exchangers). Thus, since the temperature delta between "fresh" sea water and the cooling liquid of the first cooling circuit 31 is greater than the temperature delta between the sea water of the second cooling circuit 5 and the cooling liquid of the first cooling circuit 31, the amount of heat removed is greater.

According to an aspect of it, this disclosure also provides a method for producing electrical energy in marine vessels, using an electric power generator. The method comprises a step of generating mechanical energy, in which an internal combustion engine 3 generates rotational mechanical energy from the chemical energy contained in a fuel. The method comprises a step of converting the mechanical energy into electrical energy in an alternator 4. In an embodiment of the method, a permanent magnet alternator 4 on the rotor may be used.

The method comprises a step of adjusting the frequency, in which an electrical power converter 6 adjusts the frequency of an electric current received from the stator of the alternator 4 to bring it to a predetermined value, corresponding to the power supply frequency of the user systems on board the vessel.

The method comprises a first step of exchanging heat, in which a flow of sea water circulating in a second cooling circuit 5 and passing through a first heat exchanger 503 absorbs heat from the electrical power converter 6. In an embodiment of the method, in the first step of exchanging heat, the flow of sea water absorbs heat from a portion of the electrical power converter 6 including electronic power component which are more subject to overheating.

In an embodiment, the method comprises a second step of exchanging heat. In the second step of exchanging heat, the sea water circulating in the second cooling circuit absorbs heat from the cooling liquid circulating in a first cooling circuit 31 of the internal combustion engine 3. The second step of exchanging heat is carried out in a second heat exchanger 504.

In an embodiment, the method comprises a third step of exchanging heat. In the third step of exchanging heat, the sea water circulating in the second cooling circuit absorbs heat from a cooling air flow produced by a fan. The third step of exchanging heat is carried out in a third heat exchanger 505. In an embodiment, the method comprises a step of air cooling in which an electronic card 62 of the electrical power converter 6 is traversed by the cooling air flow along a cooling direction D.

The invention claimed is:

1. An electric power generator for marine vessels, the electric power generator comprising:
 a containment enclosure provided with an inlet section and an outlet section;
 an internal combustion engine housed in the containment enclosure and including a drive shaft, rotating at a variable rotation speed, the internal combustion engine including a first cooling circuit filled with a cooling liquid that is one or more of air and water;
 an alternator housed in the containment enclosure and configured to receive mechanical power from the internal combustion engine and to convert the mechanical power into electric power, the alternator including a stator;
 a driven shaft, connected to the drive shaft to receive the mechanical power,
 a rotor keyed to the driven shaft and including permanent magnets;
 a second cooling circuit configured to circulate sea water from the inlet section to the outlet section; and
 an electrical power converter connected to the alternator to receive an input electrical current, having an input frequency, and to convert the input electrical current into an output electric current, having an output frequency different from the input frequency, the electrical power converter comprising
  a plurality of electronic power components,
  an electronic card configured to control the plurality of electronic power components, and
  a supporting structure connected to the containment enclosure to support the electrical power converter, the supporting structure including a first cooling opening and a second cooling opening, aligned along a cooling direction to allow a cooling fluid to come into contact with the electronic card, the cooling fluid being further to the cooling liquid,
 wherein the second cooling circuit comprises a first heat exchanger configured to allow heat exchange between the sea water and the electrical power converter, the first heat exchanger including an exchange element traversed by an exchange portion of the second cooling circuit and in contact with the electrical power converter in order to cool the electrical power converter.

2. The electric power generator according to claim 1, wherein the exchange element is in contact with the plurality of electronic power components to cool the plurality of electronic power components.

3. An electric power generator for marine vessels, the electric power generator comprising:
 a containment enclosure provided with an inlet section and an outlet section;
 an internal combustion engine housed in the containment enclosure and including a drive shaft, rotating at a variable rotation speed, the internal combustion engine including a first cooling circuit filled with a cooling liquid that is one or more of air and water;
 an alternator housed in the containment enclosure and configured to receive mechanical power from the internal combustion engine and to convert the mechanical power into electric power, the alternator including a stator;
 a driven shaft, connected to the drive shaft to receive the mechanical power,
 a rotor keyed to the driven shaft and including permanent magnets;
 a second cooling circuit configured to circulate sea water from the inlet section to the outlet section; and
 an electrical power converter connected to the alternator to receive an input electrical current, having an input frequency, and to convert the input electrical current into an output electric current, having an output frequency different from the input frequency, the electrical power converter comprising
  a plurality of electronic power components,
  an electronic card configured to control the plurality of electronic power components, and
  a supporting structure connected to the containment enclosure to support the electrical power converter,
 wherein the second cooling circuit comprises a first heat exchanger configured to allow heat exchange between the sea water and the electrical power converter, the first heat exchanger including an exchange element traversed by an exchange portion of the second cooling circuit and in contact with the electrical power converter in order to cool the electrical power converter
 wherein the supporting structure includes:

an exchange wall, having an inside surface, the electronic power components being mounted on the inside surface, and an outside surface in contact with the exchange element, a first supporting wall and a second supporting wall, each rising up from the exchange wall and connected to the containment enclosure at a respective fastening zone, and a first and second cooling opening aligned along a cooling direction to allow a cooling fluid to come into contact with the electronic card.

4. The electric power generator according to claim 3, further comprising a fan configured to generate a cooling air flow in the cooling direction.

5. The electric power generator according to claim 1, wherein the cooling fluid is air and
wherein the electronic card is cooled through both of the sea water and the air.

6. The electric power generator according to claim 1, wherein the second cooling circuit comprises a second heat exchanger configured to allow heat exchange between the sea water, circulating in the second cooling circuit, and the cooling liquid, circulating in the first cooling circuit.

7. The electric power generator according to claim 1, further comprising a fan configured to generate a cooling air flow directed towards the alternator and/or the electrical power converter.

8. The electric power generator according to claim 7, further comprising a third heat exchanger configured to allow heat exchange between the sea water, circulating in the second cooling circuit, and the cooling air flow generated by the fan.

9. The electric power generator according to claim 1, wherein the drive shaft of the internal combustion engine is placed in a horizontal position perpendicular to the weight force.

10. The electric power generator according to claim 1, wherein the electric power generator is self-contained within the containment enclosure.

11. The electric power generator according to claim 1, further comprising an exhaust pipe, configured to convey the combustion exhaust gases to the outside of the containment enclosure.

12. The electric power generator according to claim 11, wherein the outlet section is formed in the exhaust pipe and leads into the sea through the exhaust pipe.

13. The electric power generator according to claim 11, wherein the containment enclosure further provides an exhaust section, the exhaust pipe being coupled to the exhaust section to convey the combustion exhaust gases to the outside of the containment enclosure.

14. A method for generating electric power for marine vessels, the method comprising:
generating mechanical power by an internal combustion engine including a drive shaft which rotates at a variable rotation speed;
cooling the internal combustion engine by a first cooling circuit in which a cooling liquid circulates, the cooling liquid being one or more of air and water;
converting the mechanical power generated by the internal combustion engine into electrical power by an alternator;
circulating sea water in a second cooling circuit extending from an inlet section to an outlet section, the outlet section and the inlet section being formed in a containment enclosure;
adjusting the frequency of the electric current generated by the alternator, in an electrical converter comprising a plurality of electronic power components,
an electronic card configured to control the plurality of electronic power components, and
a supporting structure connected to the containment enclosure to support the electrical power converter, the supporting structure including a first cooling opening and a second cooling opening, aligned along a cooling direction to allow a cooling fluid to come into contact with the electronic card, the cooling fluid being further to the cooling liquid; and
cooling, by a first heat exchanger causing the sea water circulating in the second cooling circuit to cool the electrical power converter, the first heat exchanger including an exchange element traversed by an exchange portion of the second cooling circuit and in contact with the electrical power converter in order to cool the electrical power converter.

15. The method according to claim 14, further comprising exchanging heat between the sea water circulating in the second cooling circuit, and the cooling liquid, circulating in the first cooling circuit by a second heat exchanger.

16. The method according to claim 14, further comprising ventilating by a fan generating an air flow directed towards the electrical power converter to cool the electrical power converter.

17. The method according to claim 16, further comprising exchanging heat, in which the air flow passes through a third heat exchanger of the second cooling circuit and cools down by transferring heat to the sea water.

* * * * *